United States Patent
Chapuis et al.

(10) Patent No.: US 11,045,019 B2
(45) Date of Patent: Jun. 29, 2021

(54) QUICKLY CUSTOMIZABLE SYSTEMS THAT SECURE LAPTOPS TO DISPLAY TABLES AND OTHER DISPLAY SURFACES

(71) Applicant: OnQ Solutions, Inc., Hayward, CA (US)

(72) Inventors: Paul F. Chapuis, Woodside, CA (US); Steven D. Penny, Oakland, CA (US)

(73) Assignee: OnQ Solutions, Inc., Hayward, CA (US)

( * ) Notice: Subject to any disclaimer, the term of this patent is extended or adjusted under 35 U.S.C. 154(b) by 156 days.

(21) Appl. No.: 16/531,555

(22) Filed: Aug. 5, 2019

(65) Prior Publication Data
US 2021/0037992 A1 Feb. 11, 2021

(51) Int. Cl.
| | |
|---|---|
| A47F 7/00 | (2006.01) |
| A47F 5/16 | (2006.01) |
| F16M 13/02 | (2006.01) |
| F16M 11/04 | (2006.01) |
| E05B 73/00 | (2006.01) |
| G06F 1/16 | (2006.01) |

(52) U.S. Cl.
CPC .......... *A47F 7/00* (2013.01); *A47F 5/16* (2013.01); *F16M 13/02* (2013.01); *G06F 1/1616* (2013.01); *E05B 73/00* (2013.01); *F16M 11/04* (2013.01); *F16M 2200/02* (2013.01); *G06F 1/1637* (2013.01); *G06F 1/1681* (2013.01)

(58) Field of Classification Search
CPC ...... A47F 7/00; A47F 5/16; A47F 5/13; A47F 7/0246; G06F 1/1616; G06F 1/1681; F16M 13/02; F16M 11/04; F16M 2200/02; E05B 73/0082
See application file for complete search history.

(56) References Cited

U.S. PATENT DOCUMENTS

| | | | | |
|---|---|---|---|---|
| 6,700,488 | B1 * | 3/2004 | Leyden | G08B 13/1463 340/568.1 |
| 7,866,623 | B2 * | 1/2011 | Lampman | E05B 73/0082 248/551 |
| 8,074,951 | B2 * | 12/2011 | Carnevali | B60R 11/02 248/313 |
| 9,022,337 | B2 * | 5/2015 | Petruskavich | F16M 11/08 248/316.4 |
| 10,920,922 | B2 * | 2/2021 | Chapuis | F16M 11/04 |

(Continued)

*Primary Examiner* — Tan Le
(74) *Attorney, Agent, or Firm* — Vierra Magen Marcus LLP (57) ABSTRACT

A system for physically securing a laptop in an open position to a display table and methods for providing the same are described. The system includes a left bracket and a right bracket physically separate from one another. The left and right brackets each include a respective bottom support substrate, rear flange, front corner brace, side brace, and one or more fasteners extending downward from the bottom support substrate. The left bracket is configured to be attached to a left portion of a lower body portion of a laptop, and the right bracket is configured to be attached to a right portion of the lower body portion of the laptop. While the left and right brackets are attached to respective portions of a lower body portion of a laptop, the fasteners extending downward from the bottom support substrates are attachable to a display table to thereby secure the laptop thereto.

20 Claims, 9 Drawing Sheets

(56) References Cited

U.S. PATENT DOCUMENTS

2011/0024371 A1* 2/2011 Lampman ............... A47F 7/024
              211/4
2011/0133050 A1* 6/2011 Eisenberger, Sr. .... F16M 13/00
              248/551
2018/0279809 A1* 10/2018 Regan ....................... A47F 5/13

* cited by examiner

QUICKLY CUSTOMIZABLE SYSTEMS THAT SECURE LAPTOPS TO DISPLAY TABLES AND OTHER DISPLAY SURFACES

FIELD OF TECHNOLOGY

Embodiments of the present technology relate to systems that physically secure laptops to display tables and other display surfaces.

BACKGROUND

Portable electronic devices, such as laptop computers, are often sold in retail stores. Laptop computers, as the term is used herein, include notebook computers, and can be referred to more succinctly as laptops. Such a laptop typically includes a lower body portion (that includes a keyboard) and an upper body portion (that includes a display screen) that are attached to one another by a hinge. The hinge allows the laptop to selectively be put in either a closed position or an open position by a person. When in the closed position, the lower and upper body portions are facing one another and the keyboard and display screen are not viewable or accessible. When in the open position, the lower and upper body portions are not facing one another and the keyboard and display screen are viewable and accessible.

To enable customers to view, touch, and interface with laptops in a retail store, the laptops are often displayed on a display table. The laptops, which are often costly, are often secured to the display table to prevent theft. For example, a laptop can be physically secured to a table using a cable or a laptop security mount. Such laptop security mounts may be customized for a specific size of a specific laptop. It often takes a few weeks to a few months lead-time for a laptop security mount manufacturer to design, build, and distribute a new customized laptop security mount that is suitable for securing a laptop to a display table. It is typically the case that whenever a new model of a laptop is released, the size (i.e., dimensions) of the laptop is changed compared to the previous model. Accordingly, it is typically the case that whenever a new model of a laptop is released, a new customized laptop security mount (that is suitable for securing the laptop to a display table) is not available to retail stores for at least a few weeks, and potentially up to a few months.

SUMMARY

Certain embodiments of the present technology are related to a system for physically securing a laptop in an open position to a display table or other display surface, wherein the laptop includes a lower body portion including a keyboard and an upper body portion including a display screen and attached to the lower body portion by a hinge. Such a system can be designed and manufactured very quickly after a new model of a laptop is released. In accordance with certain embodiments, the system includes a left bracket and a right bracket that are physically separate from one another. The left bracket includes a left bottom support substrate, a left rear flange, a left front corner brace, a left side brace, and one or more fasteners extending downward from the left bottom support substrate. The right bracket includes a right bottom support substrate, a right rear flange, a right front corner brace, a right side brace, and one or more fasteners extending downward from the right bottom support substrate. The left bracket is configured to be attached to a left portion of a lower body portion of a laptop so that the left front corner brace is secured to a left front corner of the lower body portion of the laptop, the left side brace is secured to a left side of the lower body portion of the laptop, and the left rear flange is positioned behind a rear of the lower body portion of the laptop. The right bracket is configured to be attached to a right portion of the lower body portion of the laptop so that the right front corner brace is secured to a right front corner of the lower body portion of the laptop, the right side brace is secured to a right side of the lower body portion of the laptop, and the right rear flange is positioned behind the rear of the lower body portion of the laptop. While the left bracket is attached to the left portion of the lower body portion of the laptop, and the right bracket is attached to the right portion of the lower body portion of the laptop, the one or more fasteners extending downward from each of the left and right bottom support substrates are attachable to a display table or other display surface to thereby secure the laptop to the display table or other display surface.

In accordance with certain embodiments, the left bottom support substrate includes a left front corner brace support to which the left front corner brace is attached, and a left side brace support to which the left side brace is attached. Similarly, the right bottom support substrate includes a right front corner brace support to which the right front corner brace is attached, and a right side brace support to which the right side brace is attached.

In accordance with certain embodiments, the left and right rear flanges, respectively of the left and right brackets, are configured to prevent a laptop, which is secured to a display table or other display surface by the system, from being removed from the display table or other display surface by sliding the laptop backward along the display table or other display surface.

In accordance with certain embodiments, the left bottom support substrate and the left rear flange are integrally formed from a first blank of metal or alloy that is bent to demarcate a portion of the first blank that forms the left bottom support substrate from an adjacent portion of the first blank that forms the left rear flange. Similarly, the right bottom support substrate and the right rear flange are integrally formed from a second blank of metal or alloy that is bent to demarcate a portion of the second blank that forms the right bottom support substrate from an adjacent portion of the second blank that forms the right rear flange.

In accordance with certain embodiments, each of the left front corner brace, the left side brace, the right front corner brace, and the right side brace, or a subset thereof, is formed from a respective blank of metal or alloy that is cut in accordance with a respective flat pattern and bent in accordance with a respective bending sequence. Alternatively, each of the left front corner brace, the left side brace, the right front corner brace, and the right side brace, or a subset thereof, is molded and/or machined.

In accordance with certain embodiments, a first angle between the left bottom support substrate and the left rear flange, and a second angle between the right bottom support substrate and the right rear flange, are obtuse angles that allow an upper body portion of a laptop to be positioned at an obtuse angle relative to a lower body portion of the laptop to which the upper body portion is attached by a hinge, while the laptop is secured in an open position to a display table or other display surface by the left and right brackets of the system.

In accordance with certain embodiments, each of the left front corner brace, the left side brace, the right front corner brace, and the right side brace is made from metal or alloy.

In accordance with certain embodiments, the one or more fasteners extending downward from each of the left and right bottom support substrates comprise threaded bolts. With such embodiments, nuts are fastened to the threaded bolts, from an underside of a display table, to secure the system and the laptop secured thereto to the display table.

Certain embodiments of the present technology are related to methods for providing a system for physically securing a laptop in an open position to a display table or other display surface, wherein the laptop includes a lower body portion including a keyboard and an upper body portion including a display screen and attached to the lower body portion by a hinge. Such a method can include obtaining dimensions of the lower body portion of the laptop, including a depth and a thickness of the lower body portion of the laptop. The method also includes, based on the depth of the lower body portion of the laptop, designing and cutting or stamping first and second blanks for use in making a bottom support substrate portion, a rear flange portion, a front corner brace support portion, and a side brace support portion of each of left and right brackets of the system. The method also includes, based on the thickness of the lower body portion of the laptop, selecting from inventory left and right front corner braces and left and right side braces, or cutting or stamping further blanks for use in making the left and right front corner braces and the left and right side braces. The method additionally includes adding through-holes to the first and second blanks, and bending the first and second blanks to demarcate the portions thereof that correspond to the bottom support substrate from the rear flange, not necessarily in that order. Additionally, the method includes attaching the left front corner brace and the left side brace respectively to the front corner brace support portion and the side brace support portion of the first blank and adding fasteners extending downward from the bottom support substrate portion of the first blank to thereby produce the left bracket. The method also includes attaching the right front corner brace and the right side brace respectively to the front corner brace support portion and the side brace support portion of the second blank and adding fasteners extending downward from the bottom support substrate portion of the second blank to thereby produce the second bracket.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A, 1B, and 1C can be referred to collectively as FIG. 1.

FIGS. 2A, 2B, and 2C can be referred to collectively as FIG. 2.

FIGS. 3A, 3B, 3C, and 3D can be referred to collectively as FIG. 3.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Embodiments of the present technology relate to quickly customizable security systems that can be used to selectively secure a laptop to a display table or other display surface.

The quickly customizable security system, which can also be referred to herein more succinctly as a security system or even more succinctly as a system, can be used to secure a laptop to a display table in a manner that enables a customer or other person to view, touch, and interface with the laptop. In accordance with the embodiments described herein, certain components of the quickly customizable security system are designed such that they can be manufactured and assembled with a very short lead-time (e.g., in just a few days, and likely in just a few hours). In other words, certain components can be produced on-demand or just-in-time. Accordingly, such embodiments enable a customized security system to be available to retailers almost immediately after the dimensions of a new laptop (e.g., a new MacBook™) are released by a company (e.g., by Apple, Inc.™).

Figure 1A:
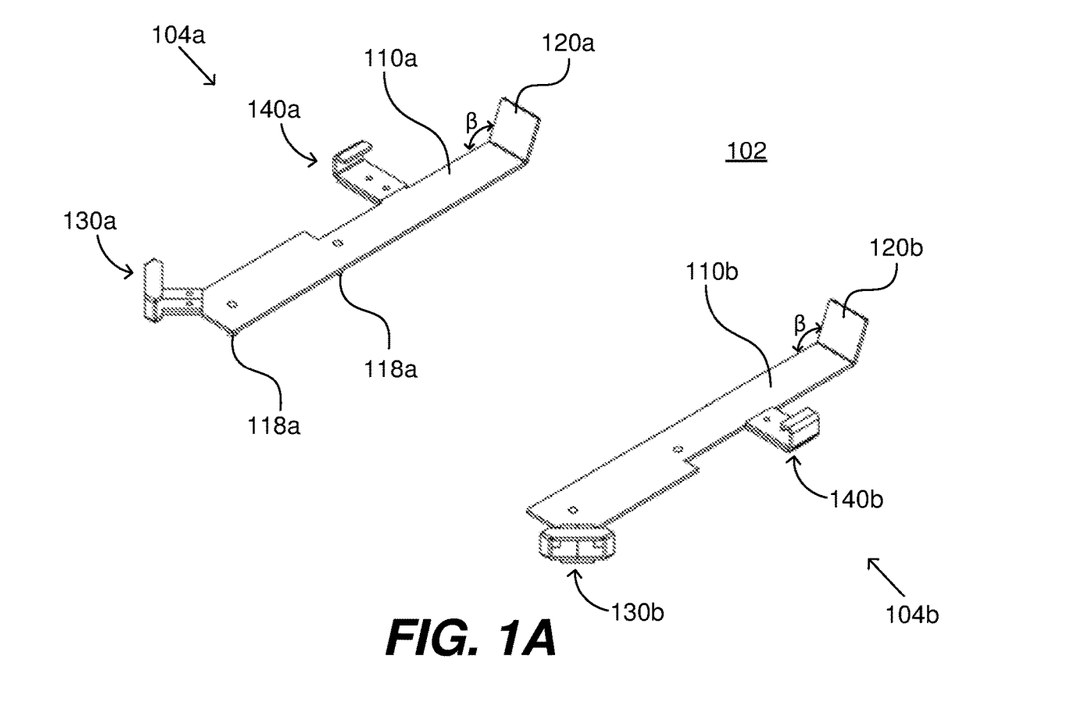
FIG. 1A is a front perspective view of a security system, according to an embodiment of the present technology, which can be used to secure a laptop to a display table or other display surface.
Figure 1B:
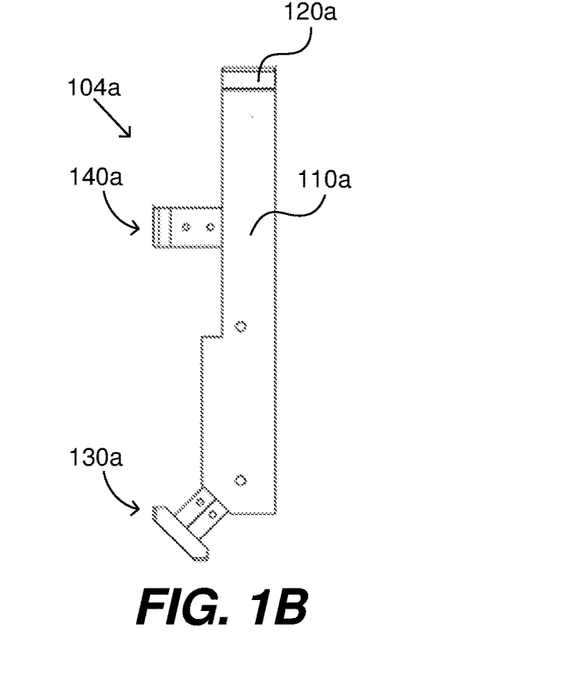
FIGS. 1B and 1C, respectively, are top and side views of one of the brackets of the security system shown in FIG. 1A.
Figure 1C:
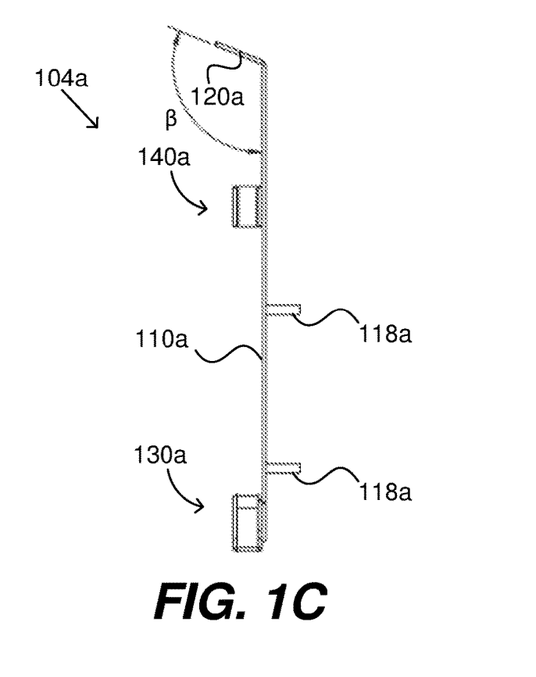

FIG. 1A is a front perspective view of a quickly customizable security system 102 according to an embodiment of the present technology. The quickly customizable security system 102 can alternatively and more succinctly be referred to as a security system, or even more succinctly as a system, as noted above. Referring to FIG. 1A, the security system 102 is shown as including a first bracket 104a and a second bracket 104b, which can also be referred to respectively as a left bracket 104a and a right bracket 104b. In the embodiment shown, the left and right brackets 104a, 104b are mirror images of one another. In alternative embodiments, the left and right brackets 104a, 104b are not mirror images of one another. FIG. 1B is a top view of the bracket 104a, and FIG. 1C is a side view of the bracket shown in FIGS. 1A and 1B. A top view of the bracket 104b would be a mirror image of FIG. 1B, and a side view of the bracket 104b would be a mirror image of FIG. 1C. FIGS. 1A, 1B, and 1C can be referred to collectively herein as FIG. 1.

The left bracket 104a is shown as including a bottom support substrate 110a, a rear flange 120a, a left front corner brace 130a, and a left side brace 140a. Extending downward from the bottom support substrate 110a are fasteners 118a (e.g., threaded bolts) that can be seen in FIGS. 1A and 1C, as well as in FIG. 2C discussed below. Similarly, the right bracket 104b is shown as including a bottom support substrate 110b, a rear flange 120b, a right front corner brace 130b, and a right side brace 140b. Extending downward from the bottom support substrate 110b are fasteners (e.g., threaded bolts) 118b that cannot be seen in FIG. 1, but can be seen in FIG. 2C discussed below. In the embodiment shown, the rear flange 120a is integrally formed with the bottom support substrate 110a, and the rear flange 120b is integrally formed with the bottom support substrate 110b.

Figure 2A:
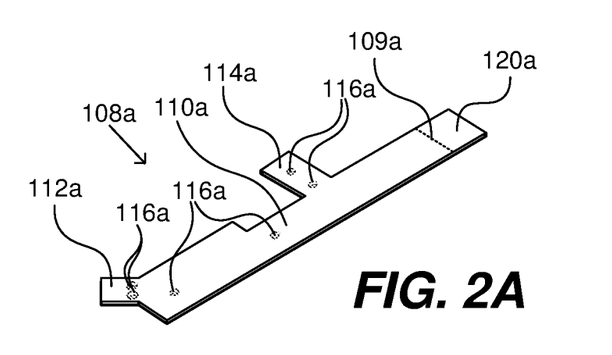
FIGS. 2A and 2B are perspective views of blanks that can be used to produce bottom support substrates of the security system shown in FIG. 1.
Figure 2B:
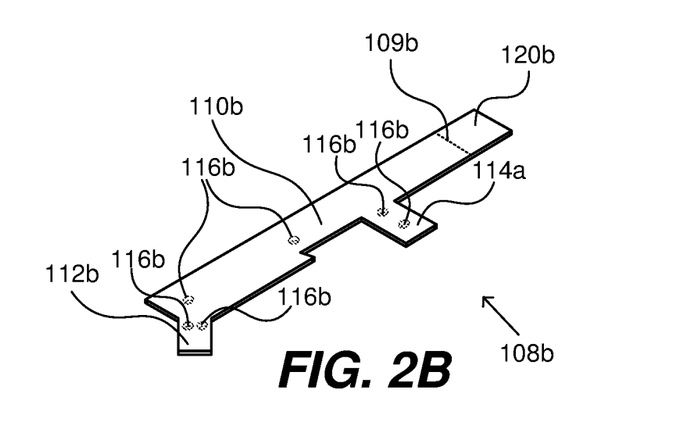

FIG. 2A is a perspective view of a blank 108a that is cut (e.g., laser cut or mechanically cut) or stamped from a sheet of metal or alloy and thereafter bent (along the dotted line 109a) to provide the bottom support substrate 110a and the rear flange 120a. FIG. 2B is a perspective view of a blank 108b that is cut (e.g., laser cut or mechanically cut) or stamped from a sheet of metal or alloy and thereafter bent (along the dotted line 109b) to provide the bottom support substrate 110b and the rear flange 120b. In accordance with certain embodiments, the thickness of each of blanks 108a, 108b is within the range of 0.05 inches and 0.1 inches, and is preferably about 0.075 inches. Referring briefly back to FIG. 1, the angle β between the bottom support substrate 110a and the rear flange 120a (as well as between the bottom support substrate 110b and the rear flange 120b) is an obtuse angle (between about 100 degrees and 130 degrees, e.g., 112 degrees) to thereby allow an upper body portion of a laptop (which upper portion includes a display screen) to be at an obtuse angle relative to the bottom portion of a laptop (which bottom portions includes a keyboard) while preventing someone from sliding the laptop backwards to remove it from the security system 102. The obtuse angle β (between the bottom support substrate 110a and the rear flange 120a) is also shown in the side view in FIG. 1C. Metalworking machines that can be used to bend the blanks 108a, 108b are often referred to as brakes, bending machines, bending breaks, sheet metal folders, or folders. The blanks 108a, 108b can be cut or stamped from the same sheet of metal or alloy, or from separate sheets of metal or alloy. Such cutting can be performed by laser cutting, mechanical cutting, or milling, but is not limited thereto. The various through-holes can be drilled (e.g., by a drill press) or otherwise made (e.g., using a laser) in the blanks 108a, 108b before they are bent, or after they are bent, and may even be drilled or otherwise made before the blanks 108a, 108b are cut or stamped from one or more sheet(s) of metal or alloy.

As shown in FIG. 2A, the bottom support substrate 110a includes a left front corner brace support 112a, and a left side brace support 114a, each of which are shown as including a pair of through-holes 116a. A further pair of through-holes 116a are included in a portion of the bottom support substrate 110a between the left front corner brace support 112a and the left side brace support 114a. Additional and/or alternative through-holes can be included in the bottom support substrate 110a.

As shown in FIG. 2B, the bottom support substrate 110b includes a right front corner brace support 112b, and a right side brace support 114b, each of which are shown as including a pair of through-holes 116b. A further pair of through-holes 116b are included in a portion of the bottom support substrate 110b between right left front corner brace support 112b and the right side brace support 114b. Additional and/or alternative through-holes can be included in the bottom support substrate 110b.

Figure 2C:
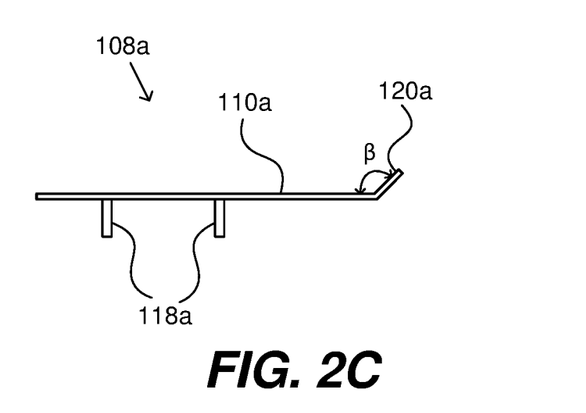
FIG. 2C is a side view of the blank shown in FIG. 2A, after a portion of the blank has been bent to provide a rear flange, and after a pair of fasteners have been inserted through a pair of the through-holes drilled or otherwise formed in the blank.

FIG. 2C is a side view of the blank 108a shown in FIG. 2A, after a portion of the blank has been bent along the dotted line 109a to provide the rear flange 120a, and after a pair of fasteners 118a have been inserted through a pair of the through-holes 116 drilled or otherwise formed in the blank 108a. The fasteners 118a can be threaded bolts, for example. In specific embodiments, the fasteners 118a are threaded PEM™ stud fasteners available from PennEngineering (headquartered in Danboro, Pa.). The length of each of the fasters 118a (and 118b) can be, e.g., about 0.75 inches, but is not limited thereto. A side view of the blank 108b in FIG. 2B would look very similar to the side view shown in FIG. 2C, and thus, need not be shown. FIGS. 2A, 2B, and 2C can also be referred to collectively herein as FIG. 2.

Figure 3A:
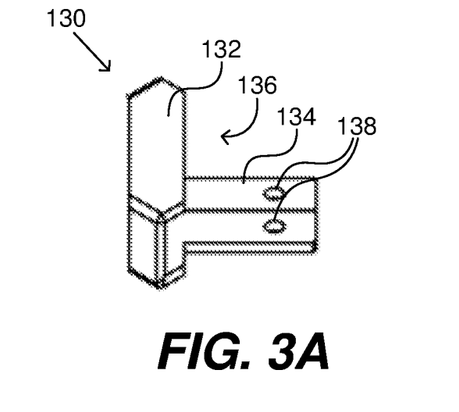
FIGS. 3A and 3B are different perspective views of a corner brace of the security system shown in FIG. 1, and FIGS. 3C and 3D are top and side views, respectively, of the corner brace.
Figure 3B:
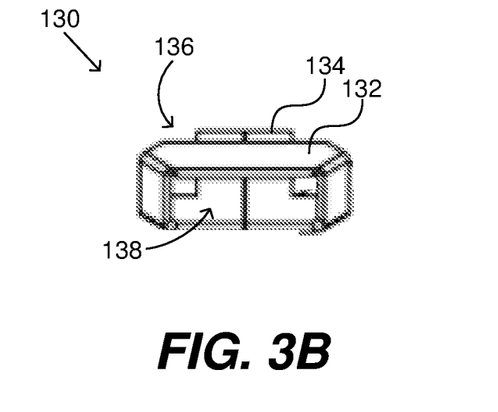
Figure 3C:
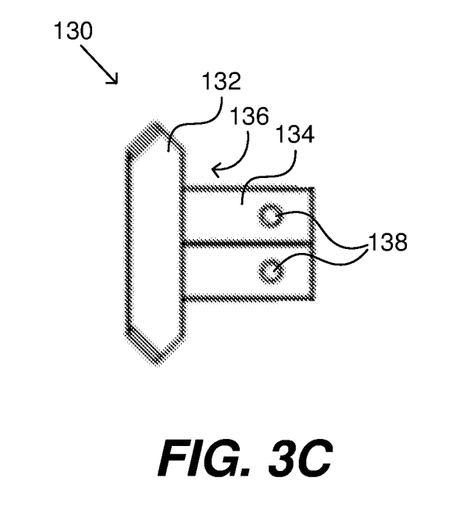
Figure 3D:
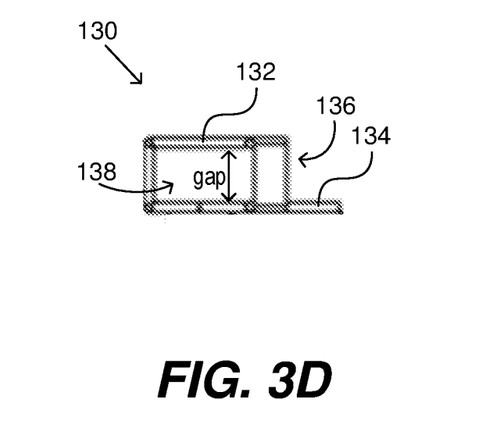
Figure 4A:
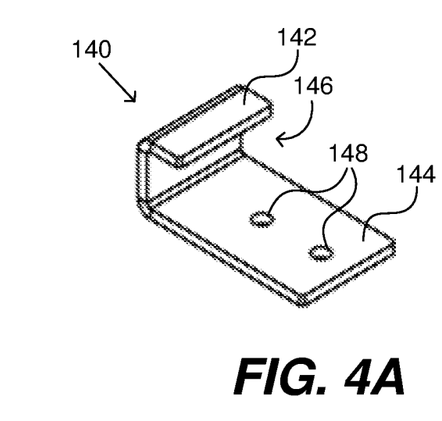
FIGS. 4A, 4B, 4C, and 4D are respectively, perspective, side, top and front views of a side brace of the security system shown in FIG. 1, and can be referred to collectively to as FIG. 4.
Figure 4B:
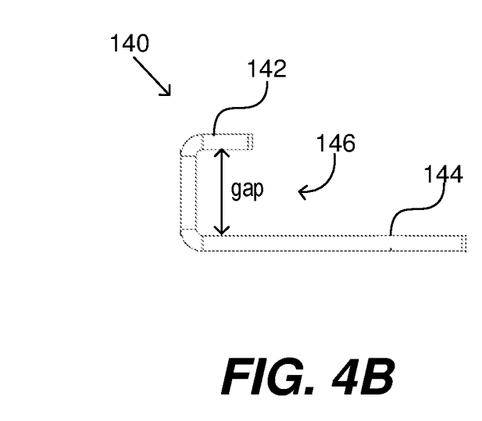
Figure 4C:
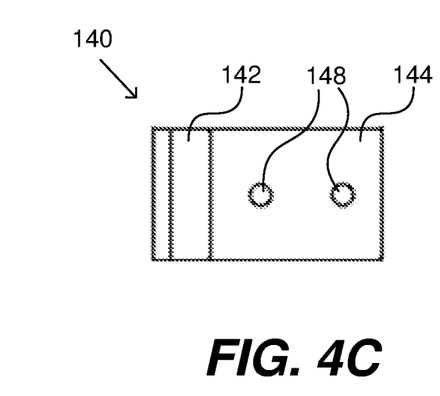
Figure 4D:
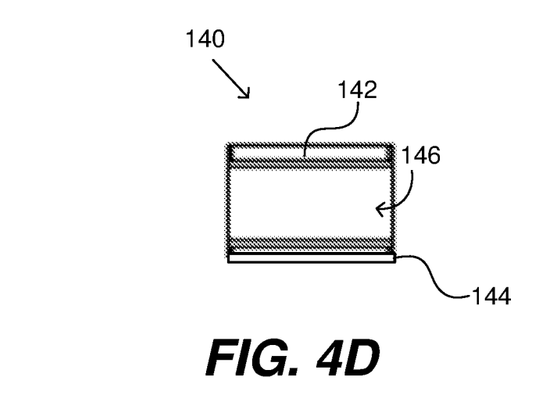

The left and right corner braces 130a, 130b can be referred to collectively as corner braces 130, or individually as a corner brace 130. In the embodiment shown, the corner braces 130a and 130b look the same as one another and are interchangeable. The primary difference between the corner braces 130a and 130b is that the corner brace 130a is connected to the bottom support substrate 110a (and more specifically, the corner brace support 112a thereof), and the corner brace 130b is connected to the bottom support substrate 110b (and more specifically, the corner brace support 112b thereof). FIGS. 3A and 3B are different perspective views of a corner brace 130, and FIGS. 3C and 3D are top and side views, respectively, of the corner brace 130. FIGS. 3A, 3B, 3C, and 3D can be referred to collectively as FIG. 3.

Each corner brace 130 includes a corner element 132 and an attachment element 134. The attachment element 134 attaches to the corner brace support 112a (of the bottom support substrate 110a) or to the corner brace support 112b (of the bottom support substrate 110b). In the embodiment shown, the attachment element 134 includes a pair of through-holes 138 that are used to attach the corner brace 130 to one of the corner brace supports 112a, 112b. A center-to-center distance of the through-holes 138 is the same as a center-to-center distance between a pair of through-holes 116 in one of the corner brace supports 112a, 112b. The corner element 132 is configured to be placed around and secured to a front corner (which is likely a rounded corner) of a lower body portion (e.g., 212 in FIGS. 5 and 6) of a laptop. Each corner element 132 (of a corner brace 130) provides a corner pocket 136 into which a front corner of a lower body portion of a laptop can be inserted and held. In the embodiment shown, each corner element 132 includes a corner opening 138 (as shown in FIGS. 3B and 3C) that enables a portion of a front corner of a lower body portion of a laptop to be seen, but that need not be the case. In other words, an alternative corner element may not enable a portion of a corner of a lower body portion of a laptop to be seen. The actual form factor of the corner elements 132, and more generally the corner braces 130, can be changed in a variety of different manners while still achieving its function of holding at least a portion of a front corner of a lower body portion of a laptop. The corner braces 130 can be formed by bending an appropriately shaped blank, or can be cast and/or machined, depending upon the specific implementation. More specifically, each corner brace 130 can be formed from a respective blank of metal or alloy that is cut in accordance with a respective flat pattern and bent in accordance with a respective bending sequence.

In certain embodiments, the attachment element 134 of a corner brace 130 can be attached to a corner brace support 112a or 112b (of one of the bottom support substrates 110a, 110b) using rivets or other types of fasteners, such as screws, or nuts and bolts, but are not limited thereto. Alternatively, or additionally, an adhesive can be used to attach the attachment element 134 of a corner brace 130 to a corner brace support 112a or 112b. Alternatively, or additionally, welding or brazing can be used to attach the attachment element 134 of a corner brace 130 to a corner brace support 112a or 112b (of one of the bottom support substrates 110a, 110b). It would also be possible to design and manufacture the attachment elements 134 (of the corner braces) and the corner brace supports 112a or 112b to mechanically inter-lock with one another, e.g., using notches and slots, and/or the like.

The left and right side braces 140a and 140b can be referred to collectively as the side braces 140, or individually as a side brace 140. FIGS. 4A, 4B, 4C, and 4D are, respectively, perspective, side, top and front views of the side brace 140, and can be referred to collectively to as FIG. 4. In the embodiment shown, the side braces 140a and 140b look the same as one another and are interchangeable. The primary difference between the side braces 140a and 140b is that the side brace 140a is connected to the bottom support substrate 110a (and more specifically, the side brace support 114a thereof), and the side brace 134b is connected to the bottom support substrate 110b (and more specifically, the side brace support 114b thereof).

The side brace 140 includes a retaining element 142 and an attachment element 144. The attachment element 144 attaches to the side brace support 114a of the bottom support substrate 110a, or to the side brace support 114b of the bottom support substrate 110b. In the embodiment shown, the attachment element 144 includes a pair of through-holes 148 that are used to attach the side brace 140 to one of the side brace supports 114a, 114b. A center-to-center distance of the through-holes 148 is the same as a center-to-center distance between a pair of through-holes 116 in one of the side brace supports 114a, 114b. The retaining element 142 is configured to be placed around and secured to a side of a lower body portion (e.g., 212 in FIGS. 5 and 6) of a laptop. In the embodiment shown, the attachment element 144 is C-shaped. Each retaining element 142 (of a side brace 140) provides a side pocket 146 into which a portion of a side of a lower body portion of a laptop can be inserted and held. The actual form factor of the retaining elements 142, and more generally the side braces 140, can be changed in a variety of different manners while still achieving its function of holding at least a portion of a side of a lower body portion of a laptop. The side braces 140 can be formed by bending an appropriately shaped blank, or can be cast and/or machined, depending upon the specific implementation. More specifically, each side brace 140 can be formed from a respective blank of metal or alloy that is cut in accordance with a respective flat pattern and bent in accordance with a respective bending sequence.

In certain embodiments, the attachment element 144 of a side brace 140 can be attached to a side brace support 114a or 114b (of one of the bottom support substrates 110a, 110b) using rivets or other types of fasteners, such as screws, or nuts and bolts, but are not limited thereto. Alternatively, or additionally, an adhesive can be used to attach the attachment element 144 of a side brace 140 to a side brace support 114a or 114b. Alternatively, or additionally, welding or brazing can be used to attach the attachment element 144 of a side brace 130 to a side brace support 114a or 114b (of one of the bottom support substrates 110a, 110b). It would also be possible to design and manufacture the attachment elements 144 (of the side braces) and the side brace supports 114a or 114b to mechanically inter-lock with one another, e.g., using notches and slots, and/or the like.

Figure 5:
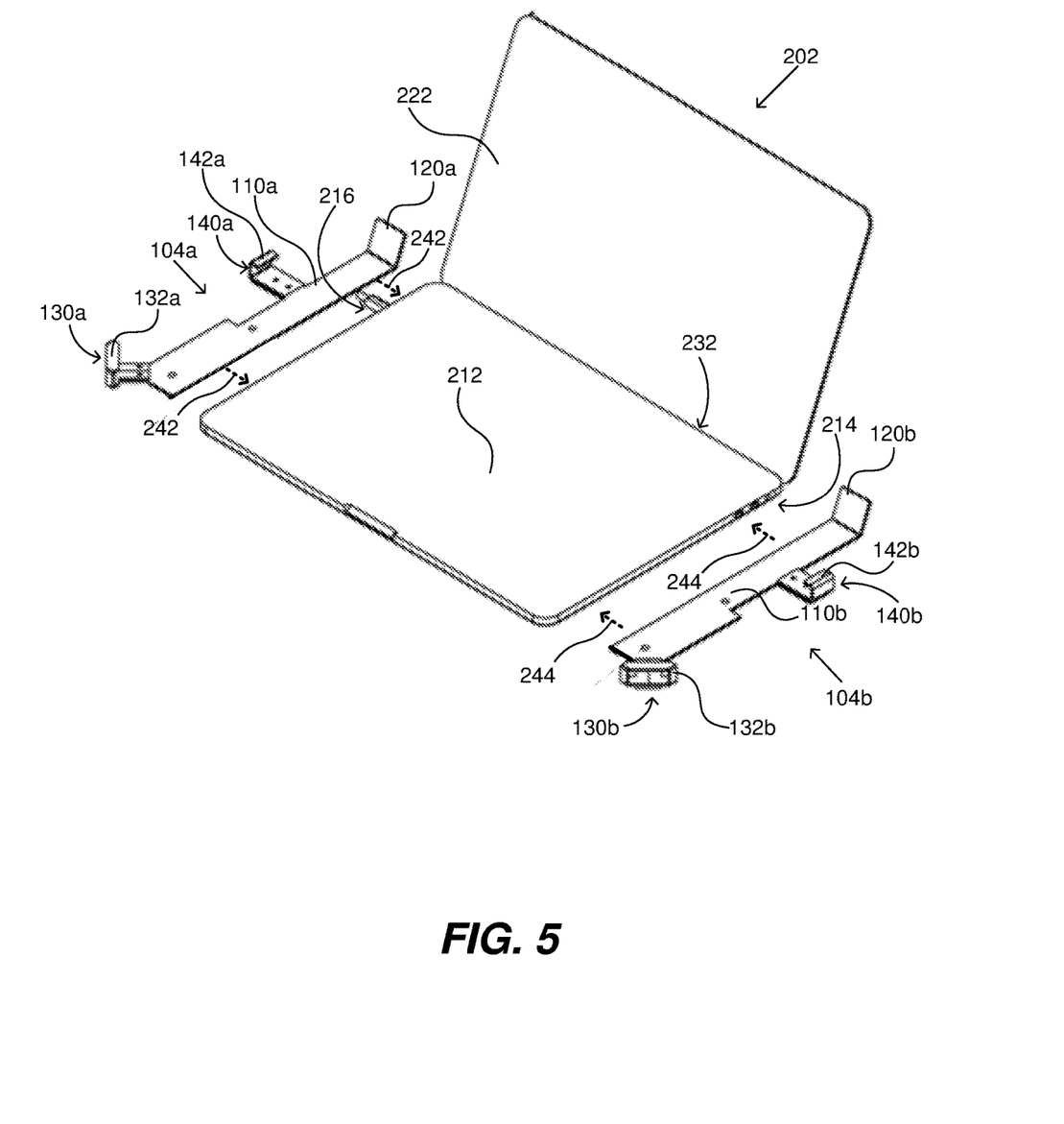
FIG. 5 illustrates how the security system introduced in FIG. 1 can be used to secure a laptop to a display table.

FIG. 5 illustrates how the security system 102 can be used to secure a laptop 202 to a display table, or more specifically, a tabletop thereof. The laptop 202 includes a lower body portion 212 and an upper body portion 222 that are attached to one another by a hinge 232. While not specifically shown in the FIGS. (to remove clutter from the FIGS.), the lower body portion 212 includes a keyboard, and the upper portion 222 includes a display screen that may or may not be a touch screen. The lower portion 212 may also include a touchpad or other type of pointing device that enables a cursor and/or other displayed elements to be maneuvered by a user. The hinge 232 allows the laptop 202 to be selectively put in either a closed position or an open position. When in the closed position, the lower and upper body portions 212, 222 face one another and the keyboard and display screen of the laptop are facing one another and not viewable or accessible. When in the open position, the lower and upper body portions are not facing one another, are preferably at an obtuse angle relative to one another, and the keyboard and display screen are viewable and accessible.

The right side of the lower body portion 212 of the laptop 202, near the rear, is shown as including input ports and/or slots 214, which can include, for example, one or more USB, HDMI, VGA, and/or Ethernet ports, as well an SD card slot and/or memory stick reader slot, but are not limited thereto. In this example, the power cord port 216 is shown as being on the left side of the lower body portion 212, near the rear. As can be appreciated from FIG. 5, and other FIGS. discussed below, the security system 102, when used to secure a laptop (e.g., 202) to a display table (e.g., 240) advantageously does not block the input ports/slots 214 and the power cord port 216.

Still referring to FIG. 5, the system 102 is shown as being attached to the laptop 202 by sliding the left bracket 104a in a rightward direction (as indicated by the dotted lined arrows 242) so that the left front corner brace 130a (and more specifically, the corner element 132a thereof) is placed around the front left corner of the lower body portion 212 of the laptop 202, so that the left side brace 140a (and more specifically, the retaining element 142a thereof) is placed around a left side of the lower body portion 212 of the laptop 202, and so that the rear flange 120a is behind a left rear portion of the lower body portion 212 of the laptop 202. Similarly, the right bracket 104b is slid in a leftward direction (as indicated by the dotted lined arrows 244) so that the right front corner brace 130b (and more specifically, the corner element 132b thereof) is placed around the front right corner of the lower body portion 212 of the laptop 202, so that the right side brace 140b (and more specifically, the retaining element 142b thereof) is placed around a right side of the lower body portion 212 of the laptop 202, and so that the rear flange 120b is behind a right rear portion of the lower body portion 212 of the laptop 202.

Figure 6A:
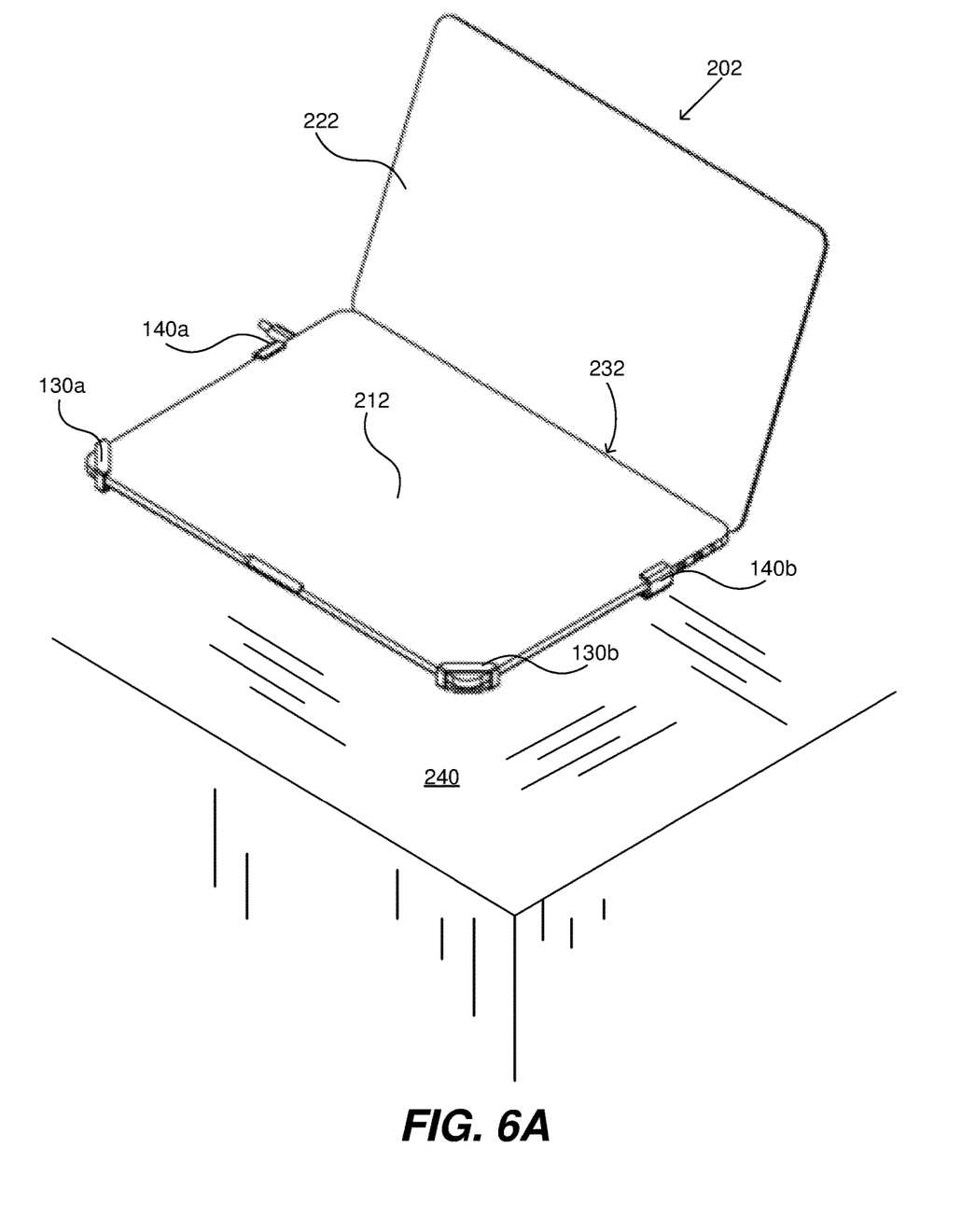
FIGS. 6A, 6B, and 6C illustrate, respectively, a front perspective view, a top plan view, and a front plan view of the security system introduced in FIG. 1 securing a laptop to a display table.
Figure 6B:
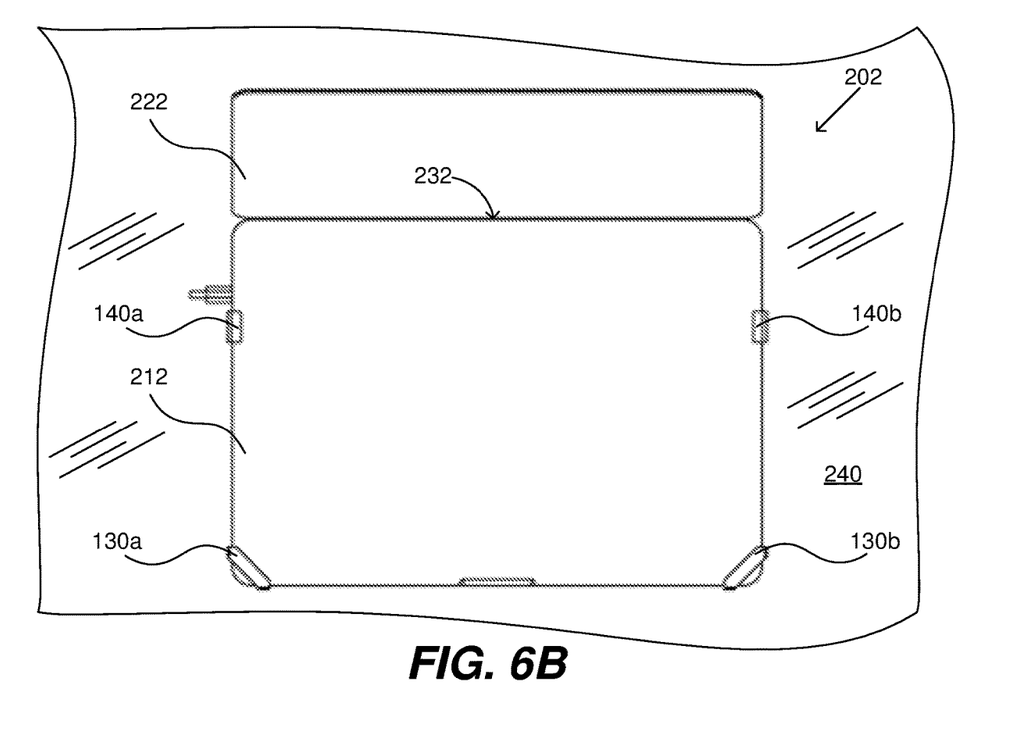
Figure 6C:
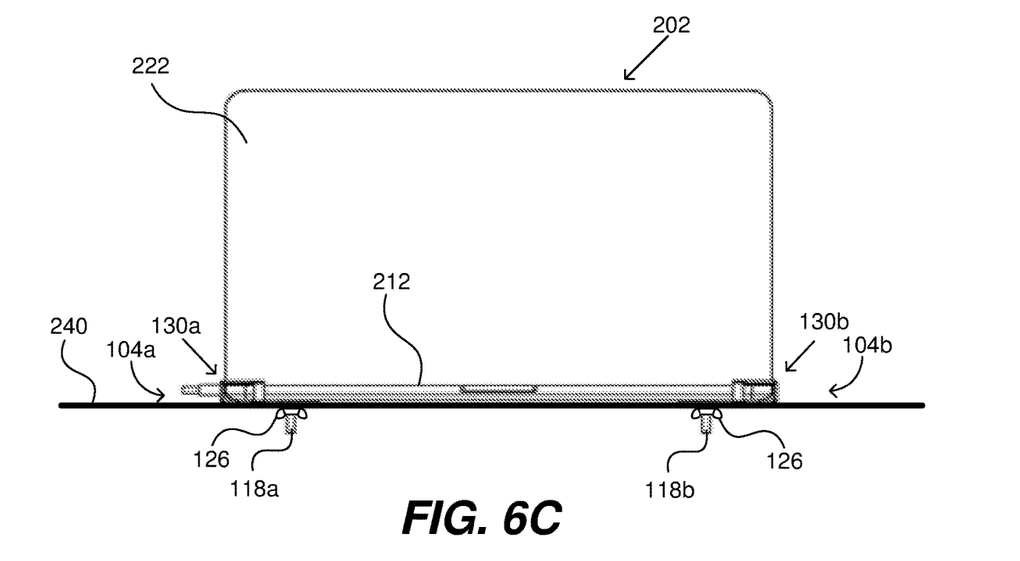

FIGS. 6A, 6B, and 6C illustrate respectively a front perspective view, a top plan view, and a front plan view of the security system 102 securing a laptop 202 to a tabletop 240 of a display table. A tabletop 240 of the display table should include through-holes that are appropriately located (i.e., spaced apart) so as to accept the fasteners 118a, 118b that extend downwards from the brackets 104a, 104b. The through-holes can be drilled in appropriate locations, or can be prearranged in a predetermined patterns of rows and columns of through-holes.

As can best be seen in FIG. 6C, nuts 126 (e.g., wingnuts) and/or other fastener hardware can then be used to secure the left and right brackets 104a and 104b to a tabletop 240 of a display table from the underside of the tabletop 240. Preferably, the underside of the tabletop 240 is made inaccessible to customers and potential thieves in a retail store, e.g., by being encased in a locked enclosure. This way potential thieves cannot remove the security system 102 from the display table, and thus, could not steal the laptop 202 that is secured to the display table by the security system 102.

Each of the elements of the security system 102 are preferably made of a strong metal or alloy (aka metal/alloy) so that the security system 102 is sturdy and cannot be readily bent, cut through, or otherwise broken or tempered with. For example, such elements can be made of steel. Different elements of the security system 102 can be made of the same metal/alloy or different metals/alloys than other elements. All or subsets of such elements can be painted, powder coated, or otherwise covered to have any desired color and appearance. Certain elements of the security system 102 can be molded and/or machined. In certain embodiments, all of the elements of the security system 102, except for the fasteners and fastener hardware, can be made from blanks that are cut (e.g., laser cut or mechanically cut) or stamped from a sheet of metal/alloy, and then bent into a desired final configuration. The through-holes in the various elements can be made before or after the aforementioned bending and/or cutting, as noted above.

In accordance with the embodiments described herein, certain components of the quickly customizable security system 102 may be kept in inventory a variety of different sizes, while other components of the quickly customizable security system are designed such that they can be manufactured and assembled with a very short lead-time (e.g., in just a few days, and likely in just a few hours). There are also certain components of the quickly customizable security system 102, such as the corner and side braces 130 and 140 that can be manufactured such that they can be used with laptops having a lower body portion within a certain range of thicknesses, wherein such components can be referred to as selectable standard components. For example, a first sized corner brace 130 can include a corner element 132 for use with a lower body portion of a laptop having a thickness in the range of 0.39 to 0.41 inches; a second sized corner brace 130 can include a corner element 132 for use with a lower body portion of a laptop having a thickness in the range of 0.42 to 0.44 inches; and a third sized corner brace 130 can include a corner element 132 for use with a lower body portion of a laptop having a thickness in the range of 0.45 to 0.47 inches. These are just examples, which are not meant to be all encompassing. Different sized side braces can also be manufactured for use with laptops having a lower body portion within certain ranges of thicknesses. The components that may be stocked in various different sizes include, e.g., the corner braces 130 and the side braces 140, which can be stocked for use with laptops having lower body portions of different thicknesses. The various fasteners and fastener hardware can also be kept in stock. The components that are designed such that they can be manufactured and assembled with a very short lead-time (e.g., in just a few days, and likely in just a few hours) can be referred to herein as quickly manufacturable customized components, or more succinctly, as customized components. Examples of the customized components include, but are not limited to, the left and right bottom support substrates 110a, 110b, which as noted above can be made from blanks 108a, 108b that are cut from one or more sheets of metal or alloy and appropriately bent, etc. Where the corner and side braces 130, 140 are also made from blanks that are cut from sheet(s) of metal or alloy and appropriately bent, etc., the corner and side braces 130, 140 can also be customized components.

In accordance with certain embodiments of the present technology, a company that makes and sells security systems, such as the quickly customizable security system 102, can stock the certain components (e.g., the selectable standard components) in a single color (e.g., white) with a single finish (matte), or in multiple colors (e.g., white, black, and silver) and/or multiple finishes (e.g., matte, glossy, and semi-gloss). The company can also stock the selectable standard components in each of a plurality of sizes, in a single color and a single finish, or in multiple different colors and/or multiple different finishes. Thereafter, as soon as the dimensions of a new model of a laptop are released by the seller of the laptop, the company that makes and sells security systems can quickly design the custom components, e.g., using computer aided design software, or the like, and then use computer controlled cutting or stamping equipment to quickly cut custom blanks (e.g., the same as or similar to the blanks 108a and 108b shown in FIGS. 2A and 2B, and then add holes and/or bends to the blanks as appropriate to produce bottom support substrates (the same as or similar to the bottom support substrate 110a, 110b). It is also possible that the entire system 102 (except, e.g., for the fasteners and fastener hardware) be customized for a specific laptop and manufactured with very little lead time, e.g., within a few days or even within a few hours.

In accordance with certain embodiments of the present technology, a company that makes and sells security systems, such as the quickly customizable security system 102, may receive an order for a specific quantity of quickly customizable security systems that are customized to hold a specific model of a specific company's laptop. For example, a big-box store may order two hundred security systems that are intended to be used to display and secure the latest model of a laptop in two hundred of the big-box store's locations. The company that makes and sells the security systems, or a subcontractor, or the like, can complete the order by selecting certain components from their stock of universal components (e.g., fasteners and fastener hardware) and their stock of selectable standard components (e.g., corner and side braces 130 and 140), and the company can quickly design and make the custom components, and then ship the components along with assembly instructions to the big-box store. Where certain components are to be secured to other components (e.g., corner and side braces 130 and 140 are to be secured to brace supports 112 and 114), the company that makes and sells the security systems can appropriately attach such elements to one another, or use a subcontractor, or the like, to perform such tasks, prior to such components being shipped to the big-box store or other type of retail store.

All of the components that are needed to assemble a single security system (e.g., 102) that is for using in securing a single laptop to a display table can be shipped in a single unit box or bag, and a plurality of such single unit boxes or bags can be shipped in a larger box or bag. Assembly instructions can be included in each single unit box or bag, or just in the larger box or bag that includes multiple such single unit boxes or bags. Referring briefly back to FIG. 1A, all the components shown therein can be placed in a single unit box or bag. Preferably, the corner and side braces 130 and 140 should already be secured to the corner and side brace supports 112 and 114 of the bottom support substrates 110a, 110b before such elements are placed in a single unit box or bag and shipped to a retail store. Fastener hardware, such as wingnuts, is preferably also included with the single unit box or bag.

After a retail store receives their shipment of security systems (e.g., 102), a worker can open a single unit box or bag and remove the components thereof. In order to secure a laptop to a display table, the worker will maneuver the left and right brackets 104a, 104b relative to a lower body portion (e.g., 212) of a laptop (e.g., 202) such that the left corner and left side braces 130a, 140a of the left bracket 104a encase a portion of a lower left front corner and a left side of the lower body portion of the laptop and the left rear flange 120a is behind a left portion of the rear of the lower body portion of the laptop; and such that right corner and right side braces 130b, 140b of the right bracket 104b encase a portion of a lower front right corner and a right side of the lower body portion of the laptop and the right rear flange 120b is behind a right portion of the rear of the lower body portion of the laptop. Such attachment of the brackets 104a, 104b to a lower body portion 212 of a laptop 202 were described above with reference to FIG. 5. At that point, the brackets 104a, 104b are secured to the lower body portion of the laptop (e.g., as shown in FIG. 6A) with fasteners (e.g., bolts) 118a, 118b extending downward from the brackets 104a, 104b. The fasteners 118a, 118b (e.g., bolts) can then be inserted into through-holes in a tabletop 240 of a display table. As shown in FIG. 6C, nuts 126 (e.g., wingnuts) can then be used to secure the security system 102 to the tabletop 240 from the underside of the tabletop 240.

Figure 7:
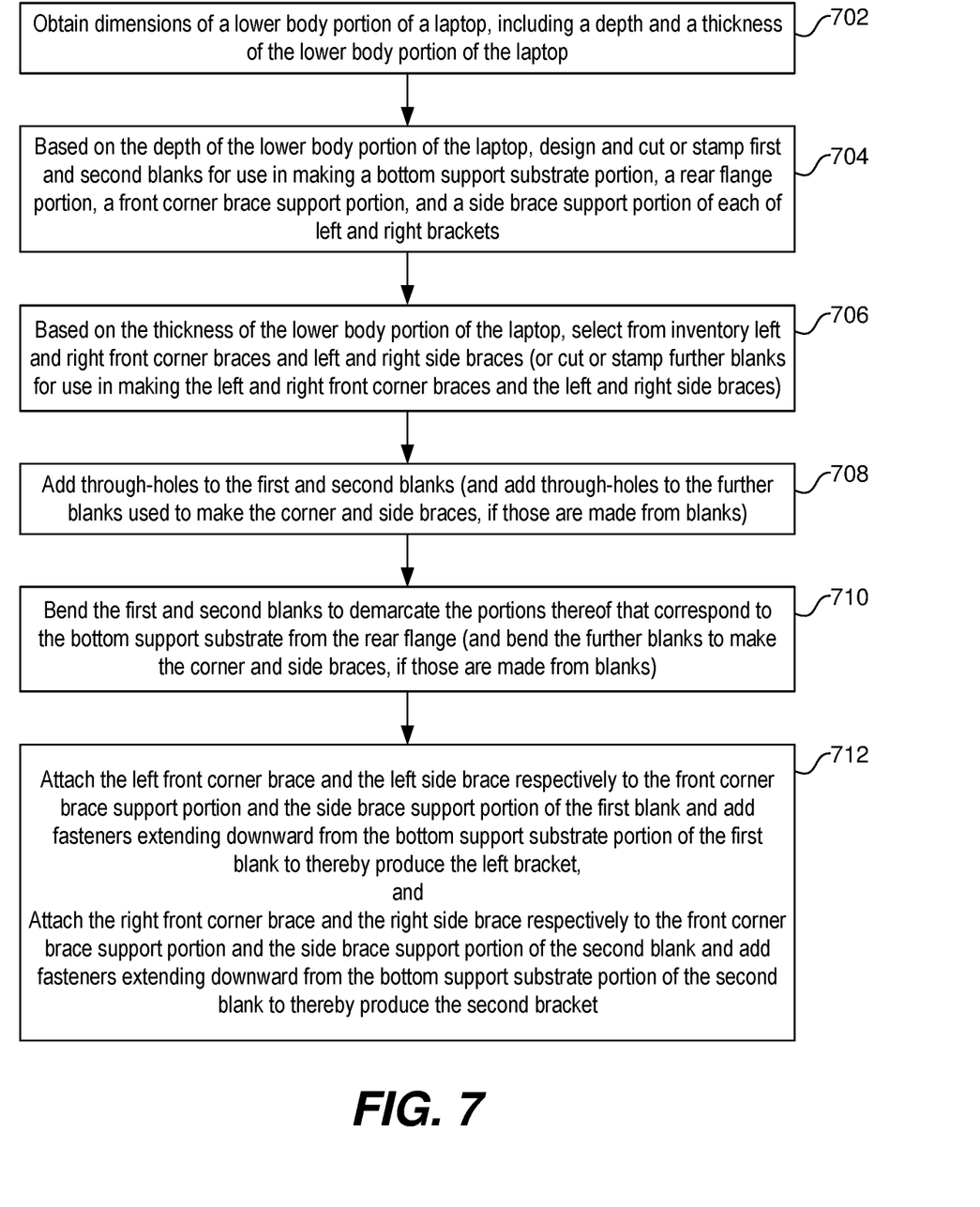
FIG. 7 is a high level flow diagram used to summarize methods, according to certain embodiments of the present technology, for providing a security system that can be used to secure a laptop to a display table or other display surface.
Figure 8A:
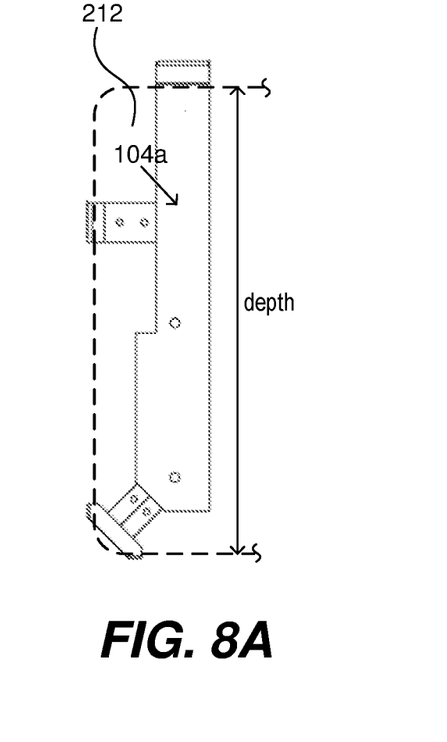
FIGS. 8A and 8B show, respectively, an example depth and an example thickness of a lower body portion of a laptop.
Figure 8B:
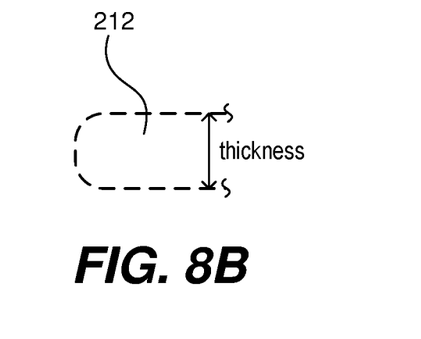

The high level flow diagram of FIG. 7 will now be used to summarize methods, according to certain embodiments of the present technology, for providing a system (e.g., 102) for physically securing a laptop (e.g., 202) in an open position to a display table or other display surface, wherein the laptop includes a lower body portion (e.g., 212) including a keyboard and an upper body portion (e.g., 222) including a display screen and attached to the lower body portion by a hinge (e.g., 232). Referring to FIG. 7, step 702 involves obtaining dimensions of the lower body portion of the laptop, including a depth and a thickness of the lower body portion of the laptop. An example depth of a lower body portion 212 of a laptop 202 is shown in FIG. 8A, and an example thickness thereof is show in FIG. 8B. In FIGS. 8A and 8B the lower body portion 212 of a laptop is shown in dashed lines.

Referring again to FIG. 7, step 704 involves, based on the depth of the lower body portion of the laptop, designing and cutting or stamping first and second blanks for use in making a bottom support substrate portion, a rear flange portion, a front corner brace support portion, and a side brace support portion of each of left and right brackets of the system.

Step 706 involves, based on the thickness of the lower body portion of the laptop, select from inventory left and right front corner braces and left and right side braces. Alternatively, step 706 involves cutting or stamping further blanks for use in making the left and right front corner braces and the left and right side braces. In accordance with certain embodiments, a gap of the corner braces (e.g., shown in FIG. 3D) is about 0.1 inches greater than a thickness of the front corners of a lower body portion of a laptop that the corner braces are being used to secure. Similarly, a gap of the side braces (e.g., shown in FIG. 4B) is about 0.1 inches greater than a thickness of the side portion of the lower body portion of the laptop that the side braces are being used to secure. The gap of the corner braces and the gap of the side braces can be the same as one another, where the thickness of a lower portion of a laptop is consistent, or they may differ from another where the thickness of a lower portion of a laptop is not consistent (e.g., gradually increased in thickness from the front to the rear of the lower portion of the laptop).

Step 708 involves adding through-holes to the first and second blanks. Step 708 can also include adding through-holes to the further blanks used to make the corner and side braces, if those are made from blanks.

Step 710 involves bending the first and second blanks to demarcate the portions thereof that correspond to the bottom support substrate (e.g., 110) from the rear flange (e.g., 120). Step 710 can also include bending the further blanks to make the corner and side braces (e.g., 130 and 140), if those are made from blanks.

Step 712 involves attaching the left front corner brace (e.g., 130a) and the left side brace (e.g., 140a) respectively to the front corner brace support portion (e.g., 112a) and the side brace support portion (e.g., 114a) of the first blank (e.g., 108a) and add fasteners (e.g., 118a) extending downward from the bottom support substrate portion of the first blank to thereby produce the left bracket (e.g., 104a). Step 712 also involves attaching the right front corner brace (e.g., 130b) and the right side brace (e.g., 140b) respectively to the front corner brace support portion (e.g., 112b) and the side brace support portion (e.g., 114b) of the second blank (e.g., 108b) and add fasteners (e.g., 118b) extending downward from the bottom support substrate portion of the second blank to thereby produce the second bracket (e.g., 104b).

The steps described above can be performed in a different order than described. For one example, steps 708 and 710 can be reversed in order. Further, the steps described above can be separated into multiple sub-steps. For example, step 704 can be separated into multiple sub-steps. For further examples, steps 706 and 712 can each be separated into multiple sub-steps. Such sub-steps need not be performed in the specific order shown in FIG. 7. For example, it is possible that a sub-step of step 706 be performed before a sub-step of step 704, while another sub-step of step 706 is performed after another sub-step of step 704.

The security systems of the embodiments of the present technology can be used to secure laptops to other display surfaces besides a horizontal display table. For example, such systems can also be used to secure laptops to a vertical display wall, if desired, or more generally, to any one of various different types of display surfaces.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for physically securing a laptop in an open position to a display table or other display surface, wherein the laptop includes a lower body portion including a keyboard and an upper body portion including a display screen and attached to the lower body portion by a hinge, the system comprising:
    a left bracket including a left bottom support substrate, a left rear flange extending at an obtuse angle from the left bottom support substrate, a left front corner brace, a left side brace, and one or more fasteners extending downward from the left bottom support substrate; and
    a right bracket including a right bottom support substrate, a right rear flange extending at the obtuse angle from the right bottom support substrate, a right front corner brace, a right side brace, and one or more fasteners extending downward from the right bottom support substrate;
    the left and right brackets physically separate from one another;
    the left bracket configured to be attached to a left portion of a lower body portion of a laptop while the laptop is in an open position so that the left front corner brace is secured to a left front corner of the lower body portion of the laptop, the left side brace is secured to a left side of the lower body portion of the laptop, and the left rear flange is positioned behind a rear of the lower body portion of the laptop;
    the right bracket configured to be attached to a right portion of the lower body portion of the laptop while the laptop is in the open position so that the right front corner brace is secured to a right front corner of the lower body portion of the laptop, the right side brace is secured to a right side of the lower body portion of the laptop, and the right rear flange is positioned behind the rear of the lower body portion of the laptop;
    wherein while the left bracket is attached to the left portion of the lower body portion of the laptop, and the right bracket is attached to the right portion of the lower body portion of the laptop, the one or more fasteners extending downward from each of the left and right bottom support substrates are attachable to a display table or other display surface to thereby secure the laptop to the display table or other display surface; and
    wherein the obtuse angle between the left bottom support substrate and the left rear flange, and the obtuse angle between the right bottom support substrate and the right rear flange, allow the upper body portion of the laptop to be positioned at an obtuse angle relative to the lower body portion of the laptop to which the upper body portion is attached by a hinge, while the laptop is secured in the open position to the display table or other display surface by the left and right brackets of the system.

2. The system of claim 1, wherein:
    the left bottom support substrate includes a left front corner brace support to which the left front corner brace is attached, and a left side brace support to which the left side brace is attached; and
    the right bottom support substrate includes a right front corner brace support to which the right front corner brace is attached, and a right side brace support to which the right side brace is attached.

3. A system for physically securing a laptop in an open position to a display table or other display surface, wherein the laptop includes a lower body portion including a keyboard and an upper body portion including a display screen and attached to the lower body portion by a hinge, the system comprising:
    a left bracket including a left bottom support substrate, a left rear flange, a left front corner brace, a left side brace, and one or more fasteners extending downward from the left bottom support substrate; and
    a right bracket including a right bottom support substrate, a right rear flange, a right front corner brace, a right side brace, and one or more fasteners extending downward from the right bottom support substrate;
    the left and right brackets physically separate from one another;
    the left bracket configured to be attached to a left portion of a lower body portion of a laptop so that the left front corner brace is secured to a left front corner of the lower body portion of the laptop, the left side brace is secured to a left side of the lower body portion of the laptop, and the left rear flange is positioned behind a rear of the lower body portion of the laptop;

the right bracket configured to be attached to a right portion of the lower body portion of the laptop so that the right front corner brace is secured to a right front corner of the lower body portion of the laptop, the right side brace is secured to a right side of the lower body portion of the laptop, and the right rear flange is positioned behind the rear of the lower body portion of the laptop;

wherein the left and right rear flanges, respectively of the left and right brackets, are configured to prevent the laptop, which is secured to a display table or other display surface by the system, from being removed from the display table or other display surface by sliding the laptop backward along the display table or other display surface; and wherein an angle β between the left bottom support substrate and the left rear flange, and between the right bottom support substrate and the right rear flange, is an obtuse angle that allows an upper body portion of the laptop to be at an obtuse angle relative to a lower body portion of the laptop while the laptop is secured in the open position to the display table or other display surface by the system.

4. A system for physically securing a laptop in an open position to a display table or other display surface, wherein the laptop includes a lower body portion including a keyboard and an upper body portion including a display screen and attached to the lower body portion by a hinge, the system comprising:

a left bracket including a left bottom support substrate, a left rear flange, a left front corner brace, a left side brace, and one or more fasteners extending downward from the left bottom support substrate; and a right bracket including a right bottom support substrate, a right rear flange, a right front corner brace, a right side brace, and one or more fasteners extending downward from the right bottom support substrate;

the left and right brackets physically separate from one another;

the left bracket configured to be attached to a left portion of a lower body portion of a laptop so that the left front corner brace is secured to a left front corner of the lower body portion of the laptop, the left side brace is secured to a left side of the lower body portion of the laptop, and the left rear flange is positioned behind a rear of the lower body portion of the laptop;

the right bracket configured to be attached to a right portion of the lower body portion of the laptop so that the right front corner brace is secured to a right front corner of the lower body portion of the laptop, the right side brace is secured to a right side of the lower body portion of the laptop, and the right rear flange is positioned behind the rear of the lower body portion of the laptop;

wherein the left bottom support substrate and the left rear flange are integrally formed from a first blank of metal or alloy that is bent to demarcate a portion of the first blank that forms the left bottom support substrate from an adjacent portion of the first blank that forms the left rear flange;

wherein the right bottom support substrate and the right rear flange are integrally formed from a second blank of metal or alloy that is bent to demarcate a portion of the second blank that forms the right bottom support substrate from an adjacent portion of the second blank that forms the right rear flange; and wherein while the left bracket is attached to the left portion of the lower body portion of the laptop, and the right bracket is attached to the right portion of the lower body portion of the laptop, the one or more fasteners extending downward from each of the left and right bottom support substrates are attachable to a display table or other display surface to thereby secure the laptop to the display table or other display surface.

5. The system of claim 4, wherein:

each of the left front corner brace, the left side brace, the right front corner brace, and the right side brace is formed from a respective blank of metal or alloy that is cut in accordance with a respective flat pattern and bent in accordance with a respective bending sequence.

6. The system of claim 4, wherein:

each of the left front corner brace, the left side brace, the right front corner brace, and the right side brace is molded and/or machined.

7. The system of claim 4, wherein:

an obtuse angle between the left bottom support substrate and the left rear flange, and an obtuse angle between the right bottom support substrate and the right rear flange, allow an upper body portion of a laptop to be positioned at an obtuse angle relative to a lower body portion of the laptop to which the upper body portion is attached by a hinge, while the laptop is secured in an open position to a display table or other display surface by the left and right brackets of the system.

8. The system of claim 1, wherein:

each of the left front corner brace, the left side brace, the right front corner brace, and the right side brace is made from metal or alloy.

9. The system of claim 1, wherein:

the one or more fasteners extending downward from each of the left and right bottom support substrates comprise threaded bolts.

10. The system of claim 9, further comprising:

nuts that are fastenable to the threaded bolts, from an underside of a display table, to thereby secure the system and the laptop secured thereto to a display table.

11. A system for physically securing a laptop in an open position to a display table or other display surface that is not part of the system, wherein the laptop includes a lower body portion including a keyboard and an upper body portion including a display screen and attached to the lower body portion by a hinge, the system comprising:

a left bracket configured to be attached to a left portion of a lower body portion of a laptop while the laptop is in an open position, the left bracket including one or more fasteners extending downward;

a right bracket physically separate from the left bracket and configured to be attached to a right portion of the lower body portion of the laptop while the laptop is in the open position, the right bracket including one or more fasteners extending downward;

wherein while the left bracket is attached to the left portion of the lower body portion of the laptop, the one or more fasteners extending downward from the left bracket are attachable to a display table or other display surface that is not part of the system, by inserting the one or more fasteners extending downward from the left bracket through a first set of one or more throughholes in the display table or other display surface; and wherein while the right bracket is attached to the right portion of the lower body portion of the laptop, the one or more fasteners extending downward from the left bracket are separately attachable to the display table or other display surface that is not part of the system, by inserting the one or more fasteners extending downward from the left bracket through a second set of one or more through-holes in the display table or other display surface.

12. The system of claim 11, wherein:

the left bracket includes a front portion configured to be secured to a left front corner of a lower body portion of a laptop, a side portion configured to be secured to a left side of the lower body portion of the laptop, and a rear portion configured to be positioned behind a left rear portion of the lower body portion of the laptop; and the right bracket includes a front portion configured to be secured to a right front corner of the lower body portion of the laptop, a side portion configured to be secured to a right side of the lower body portion of the laptop, and a rear portion configured to be positioned behind a right rear portion of the lower body portion of the laptop.

13. The system of claim 12, wherein:

the left bracket includes a left bottom support substrate to which each of the front portion, the side portion, and the rear portion of the left bracket are connected; and the right bracket includes a right bottom support substrate to which each of the front portion, the side portion, and the rear portion of the right bracket are connected.

14. The system of claim 13, wherein the left bottom support substrate and the rear portion of the left bracket are integrally formed from a first blank of metal or alloy that is bent to demarcate a portion of the first blank that forms the left bottom support substrate from an adjacent portion of the first blank that forms the rear portion of the left bracket; and the right bottom support substrate and the rear portion of the right bracket are integrally formed from a second blank of metal or alloy that is bent to demarcate a portion of the second blank that forms the right bottom support substrate from an adjacent portion of the second blank that forms the rear portion of the right bracket.

15. The system of claim 14, wherein:

each of the front portion and the side portion of each of the left and right brackets is formed from a respective blank of metal or alloy that is cut in accordance with a respective flat pattern and bent in accordance with a respective bending sequence.

16. The system of claim 14, wherein:

each of the front portion and the side portion of each of the left and right brackets is molded and/or machined.

17. A method for providing a system for physically securing a laptop in an open position to a display table or other display surface, wherein the laptop includes a lower body portion including a keyboard and an upper body portion including a display screen and attached to the lower body portion by a hinge, the method comprising:

obtaining dimensions of the lower body portion of the laptop, including a depth and a thickness of the lower body portion of the laptop;

based on the depth of the lower body portion of the laptop, designing and cutting or stamping first and second blanks for use in making a bottom support substrate portion, a rear flange portion, a front corner brace support portion, and a side brace support portion of each of left and right brackets of the system;

based on the thickness of the lower body portion of the laptop, selecting from inventory left and right front corner braces and left and right side braces, or cutting or stamping further blanks for use in making the left and right front corner braces and the left and right side braces;

adding through-holes to the first and second blanks;

bending the first blank to demarcate the portions thereof that correspond to the bottom support substrate from the rear flange of the left bracket and so that an angle between the bottom support substrate and the rear flange of the left bracket is an obtuse angle;

bending the second blank to demarcate the portions thereof that correspond to the bottom support substrate from the rear flange of the right bracket and so that an angle between the bottom support substrate and the rear flange of the right bracket is the obtuse angle; and attaching the left front corner brace and the left side brace respectively to the front corner brace support portion and the side brace support portion of the first blank and adding fasteners extending downward from the bottom support substrate portion of the first blank to thereby produce the left bracket, and attaching the right front corner brace and the right side brace respectively to the front corner brace support portion and the side brace support portion of the second blank and adding fasteners extending downward from the bottom support substrate portion of the second blank to thereby produce the right bracket.

18. The method of claim 17, wherein:

the left bracket is configured to be attached to a left portion of the lower body portion of a laptop, the left bracket including one or more fasteners extending downward; and the right bracket is physically separate from the left bracket and configured to be attached to a right portion of the lower body portion of the laptop, the right bracket including one or more fasteners extending downward.

19. The method of claim 17, wherein:

the left and right front corner braces and left and right side braces are selected from inventory based on the thickness of the lower body portion of the laptop.

20. The method of claim 17, wherein:

the left and right front corner braces and left and right side braces are produced, based on the thickness of the bottom portion of the laptop, by cutting or stamping blanks for use in making the left and right front corner braces and the left and right side braces, and bending said blanks.

* * * * *